W. S. ELLIOTT.
TURBINE.
APPLICATION FILED OCT. 9, 1918.
1,342,845.
Patented June 8, 1920.
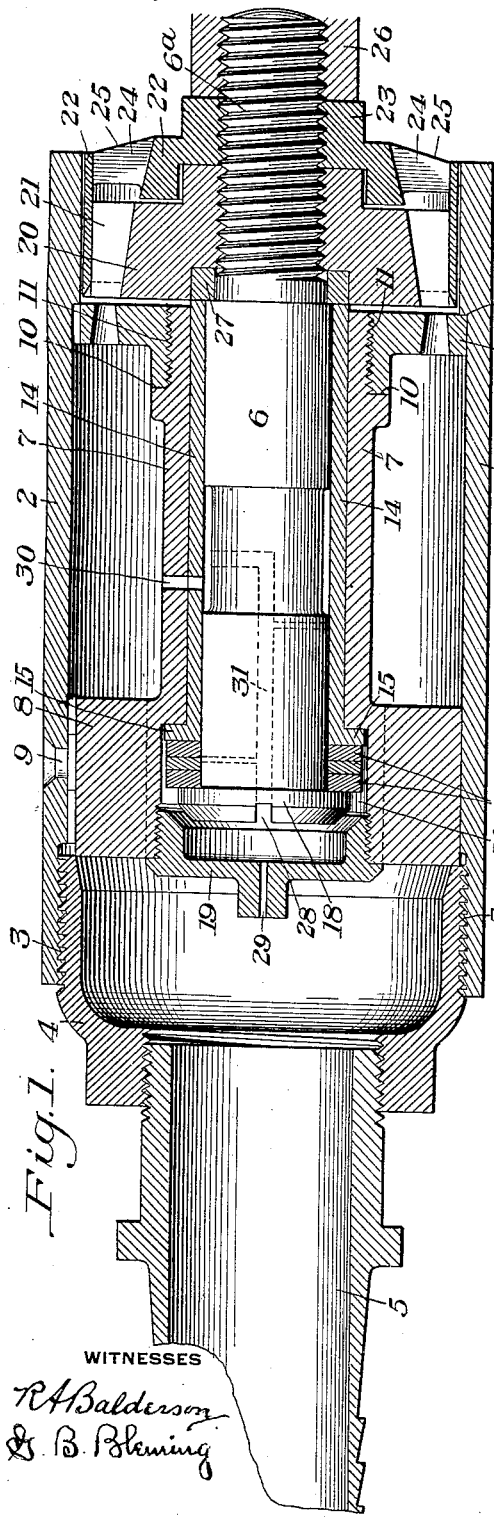
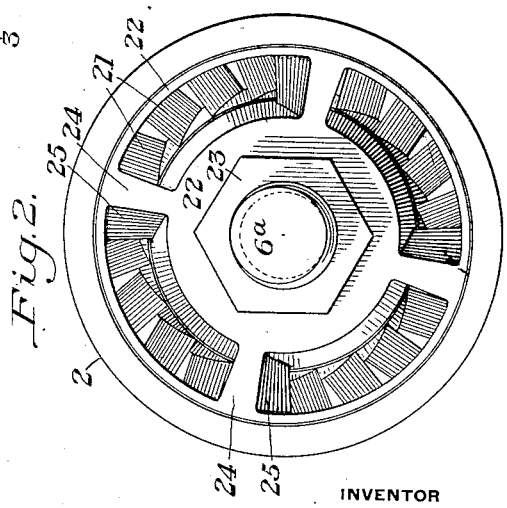
WITNESSES
R. A. Balderson
J. B. Fleming
INVENTOR
William S. Elliott
by Bakewell, Byrnes & Parmelee
Attys

UNITED STATES PATENT OFFICE.

WILLIAM S. ELLIOTT, OF PITTSBURGH, PENNSYLVANIA, ASSIGNOR TO ELLIOTT COMPANY, OF PITTSBURGH, PENNSYLVANIA, A CORPORATION OF PENNSYLVANIA.

TURBINE.

1,342,845.  Specification of Letters Patent.  Patented June 8, 1920.

Application filed October 9, 1918. Serial No. 257,513.

*To all whom it may concern:*

Be it known that I, WILLIAM S. ELLIOTT, a citizen of the United States, residing at Pittsburgh, Allegheny county, Pennsylvania, have invented a new and useful Improvement in Turbines, of which the following is a full, clear, and exact description, reference being had to the accompanying drawing, forming part of this specification, in which—

Figure 1 is a longitudinal sectional view of the turbine embodying my invention.

Fig. 2 is a front end view.

Fig. 3 is a fragmentary sectional view showing certain of the parts, and

Fig. 4 is a longitudinal section of the shroud removed.

My invention has relation to turbines, and more particularly, to that class of turbines which is employed for driving boiler tube cleaner tools, although it may be applicable to other purposes.

One object of my invention is to provide a turbine having a removable shroud which is normally securely fastened in place upon the turbine wheel, but which can be readily removed and replaced when necessary.

A further object of my invention is to provide a turbine motor, which is strong and serviceable; whose parts can be readily assembled and disassembled, and which is well adapted to withstand the severe shocks and vibrations to which devices of this kind are subject in use.

The nature of my invention will be best understood by reference to the accompanying drawing in which I have shown a preferred embodiment thereof and which will now be described, it being premised, however, that various changes can be made in the details of construction, arrangement and combination of its several parts, without departing from the spirit and scope of my invention, as defined in the appended claims.

In this drawing, the numeral 2 designates the outer shell or casing of the turbine. This shell or casing is open at both ends, its rear end portion being internally threaded, as shown at 3, to receive the hose coupling and reducer 4 into which is screwed the supply pipe 5. 6 designates the turbine shaft which is journaled in the body member 7, the latter being inserted into the casing or shell 2 at the open rear end thereof. The member 7 has a head 8 at its rear end portion which fits snugly within the casing or shell just beyond the threaded portion 3, and which is held from turning by any suitable means, such as a pin or dowel inserted at 9. This member 7 is provided with the usual openings for the passage of the motive fluid therethrough. Said member also has an elongated tubular forward extension shouldered at 10 and externally threaded in front of said shoulder, as indicated at 11, to receive the stationary turbine member 12 whose hub portion is screwed on said threaded portion. Said turbine member may, however, be made integral with the member 7. The stationary turbine member seats forwardly against an internal shoulder 13 of the casing or shell, against which it is forced and securely held by the locking action of the hose coupling 4 when the latter is screwed up against the head 8, in the manner shown in Fig. 1. The member 7 has seated therein an elongated bushing 14 which forms the immediate bearing for the shaft 6. The rear end of the bushing is flanged as shown at 15, this flange seating within the recess or chamber 16 in the head 8, and a plurality of thrust members or washers 17 are preferably seated around the shaft between this flange and the headed end 18 of the shaft, said washers and headed end also being within the chamber 16. The rear end of this chamber is normally closed by a removable screw-cap 19.

20 designates the turbine wheel which is provided with the usual vanes 21, said wheel being screwed upon the threaded extension 6ª of the shaft 6. 22 designates a shroud having a shell portion which removably fits around and incloses the vanes 21, and a hub portion 23 which is screwed upon the shaft extension 6ª against the forward end of the wheel 20, the inner face of said hub portion being recessed to engage the hub projection of the wheel. The hub and shell portions of the shroud are connected by radial arms 24. These arms 24 have their surfaces 25 inclined at an angle which is preferably equal to but not greater than the angle of discharge of the vanes so as to afford a minimum resistance to the discharge of the motive fluid from the wheel. When the tool or tool carrier, indicated at 26, is screwed up against the shroud, the latter, together with the wheel, is securely locked upon the shaft. When, however, on account of wear or other causes it is desired to remove the shroud, this can be readily done and a new one can then be placed upon the wheel. This part of my invention overcomes in a very simple and efficient manner the difficulties which have heretofore existed when it has been attempted to fixedly and permanently secure a shroud upon a turbine wheel. The rear face of the wheel is provided with an inset wear or thrust ring 27 which coacts with the forward end of the bushing 14. The head 18 of the shaft may be provided with a screw-driver seat 28 for the purpose of holding the shaft against rotation while seating and unseating the wheel and shroud.

The cap-screw 19 is shown as having a small opening 29 through which water may enter; and a similar opening 30 is shown as extending through the member 7 and bushing 14 opposite a reduced portion of the shaft 6, for a similar purpose. Either one, or both, of these openings may be employed. The shaft 6 is preferably provided with distributing openings 31 for such water.

By unscrewing the hose coupling, it will be readily seen that all the parts contained within the shell or casing may be readily removed from the rear end thereof. This very greatly facilitates getting access to the parts for repairs and renewals. It will also be noted that the shaft 6 has a long bearing in the member 7, and that the latter is firmly supported within the casing or shell by the head 8 at one end and by the stationary turbine member at the opposite end.

It will be readily understood that the novel form of shroud herein described may be applied to other forms and locations of turbine wheels.

I claim:

1. In a turbine, a turbine shaft having a threaded portion, a wheel seated on said shaft, and a shroud for said wheel removably seated on said threaded portion, together with a tool carrier also secured to said threaded portion and locking the shroud on said shaft, substantially as described.

2. In a turbine, the combination of a shaft having a threaded portion, a turbine wheel screwed on said threaded portion, and a shroud for the wheel removably seated on said threaded portion, said shroud having a recessed inner face embracing a hub projection on said wheel, substantially as described.

3. In a turbine, the combination of a shaft having a threaded portion, a turbine wheel screwed on said threaded portion, and a shroud for the wheel removably seated on said threaded portion, said shroud having a recessed inner face embracing a hub projection on said wheel and having its hub and shell portions connected by radial arms having inclined lateral faces, substantially as described.

4. A turbine motor comprising an outer casing or shell having an internal shoulder near its forward end, a body member removably seated in said casing or shell, said body member having a head at its rear end and a stationary turbine member threaded upon its front end, and a coupling member threaded into the rear portion of the casing against the rear face of said head and acting to force the body member forwardly to hold the stationary turbine member against said internal shoulder, substantially as described.

5. A turbine motor comprising an outer shell or casing, a body member removably seated therein and having a fixed head at one end and a removable stationary turbine member at its opposite end, there being a water space or chamber between said head and stationary turbine member, a turbine shaft journaled in said body member and removable rearwardly through same, a turbine wheel removably secured on the forward end portion of said shaft, and a coupling member engaging the rear end portion of the casing or shell and forming a lock for the parts contained therein, said parts being removable rearwardly through the casing or shell when the coupling member is removed, substantially as described.

6. A turbine motor, comprising an outer casing or shell, a body member removably seated in said casing or shell and having an integral head at its rear end portion and an elongated sleeve portion of less diameter than the head and which extends forwardly to a point near the front end of the casing or shell, and forming a long bearing support for a turbine shaft, and having a stationary turbine member at its forward end, and a coupling member threaded into the rear portion of the casing against said head, the shell or casing having an internal abutment for the stationary turbine member and against which it is held by the action of the coupling member, substantially as described.

In testimony whereof, I have hereunto set my hand.

WILLIAM S. ELLIOTT.